3,322,681
PROCESS FOR PREPARING LANTHANUM, YTTRIUM OR LUTETIUM PHOSPHATE PHOSPHORS
Arthur L. Smith, Lancaster, Pa., assignor to Radio Corporation of America, a corporation of Delaware
No Drawing. Filed Dec. 9, 1963, Ser. No. 329,226
1 Claim. (Cl. 252—301.4)

This invention relates to an improved process for preparing cerium-activated phosphates of lanthanum, yttrium, and lutetium.

Phosphors composed of cerium-activated phosphates of lanthanum, yttrium, and lutetium and their uses have been described previously by C. W. Struck in U.S. Patent No. 3,104,226 issued Sept. 17, 1963. That patent also describes a process for preparing such phosphors comprising coprecipitating a mixture of constituent phosphates from an aqueous solution, and then drying and firing the coprecipitate at about 900 to 1200° C. in air to form the phosphor. While this previous process produces useful phosphors it is relatively expensive and time consuming to handle the coprecipitated phosphates, which are gelatinous and thus extremely difficult to wash free of impurities. In addition, it is desirable to provide a process which is easier to control and produces a more uniform product.

An object of this invention is to provide an improved process for preparing phosphors of the type described.

Another object is to provide a process for preparing cerium-activated phosphates of lanthanum, yttrium, and lutetium, which process is less expensive and less time consuming to carry out, is easier to control, and produces a more uniform product.

Briefly, the improved process comprises:

(1) Preparing an intimate dry physical mixture, preferably by coprecipitation followed by drying, of cerium carbonate and carbonates of at least one member of the group consisting of lanthanum, yttrium, and lutetium, (2) Adding dry ammonium phosphate to the dry mixture, and then, (3) Heating the dry mixture of carbonates and phosphate at between 1050 and 1150° C. until said phosphor is formed.

The problem of handling gelatinous aqueous phosphate coprecipitates is avoided by mixing, as by coprecipitating, carbonates of the same cations, which carbonates are crystalline and therefore easier to handle. The dry mixture of carbonates is then mixed and reacted with ammonium phosphate in the dry state at elevated temperatures, producing the desired phosphor and volatile products. This process is less time consuming easier to control, and produces a more uniform product from batch to batch than prior processes.

Example.—The following example is illustrative of the improved process of the invention.

(I) Prepare an aqueous solution of lanthanum nitrate $La_2(NO_3)_3$ as follows: (1) suspend one pound of lanthanum oxide $La_2O_3$ in about 1200 ml. of demineralized water, (2) add 535 ml. of concentrated nitric acid slowly to the suspension with constant stirring to dissolve the oxide, (3) filter the solution, and then, (4) add enough water to make 2000 ml. of lanthanum nitrate solution.

(II) Prepare a coprecipitate of lanthanum carbonate $La_2(CO_3)_3$ and cerous carbonate $Ce_2(CO_3)_3$ as follows: (1) add to 1000 ml. of the lanthanum nitrate solution 61 ml. of an aqueous solution containing 0.1 g./ml. of cerous nitrate $Ce(NO_3)_3 \cdot 6H_2O$, (2) dissolve 250 g.

$$(NH_4)_2CO_3$$

in 1150 ml. warm water, (3) react the two solutions slowly with stirring for about 15 minutes to produce the coprecipitate, (4) filter the coprecipitate and wash twice in demineralized warm water, (5) oven dry the coprecipitate at about 110° C., and then, (6) screen the dry coprecipitate through a 60 mesh screen. The coprecipitate is a physical mixture of lanthanum carbonate $La_2(CO_3)_3$ containing about one mol percent cerous carbonate $Ce_2(CO_3)_3$.

(III) Prepare a reaction mixture as follows: (1) weigh a quantity of the dry coprecipitate, (2) add 2.1 mol parts ammonium monohydrogen phosphate $(NH_4)_2HPO_4$ for each 1.0 mol part lanthanum carbonate in the quantity of the coprecipitate, (3) place the mixture in a container with rubber stoppers and then, (4) dry mix the mixture for about 30 minutes to complete the preparation of the reaction mixture.

(IV) React the reaction mixture to produce the phosphor as follows: (1) place a quantity of the reaction mixture in a quartz container, (2) heat the reaction mixture and quartz container in air at about 1100° C. for about 90 minutes, (3) cool and screen the reacted material through a 60 mesh screen, (4) place a quantity of the reacted material in a carbon container and cover the container with a carbon lid, (5) heat the reacted material in the covered carbon container in air at about 1000° C. for about 90 minutes (this step reduces any ceric ions $Ce^{4+}$ in the reacted material to cerous ions $Ce^{3+}$), and then, (6) cool and screen the reacted and reduced material through a 60 mesh screen.

The product of the foregoing process is a phosphor having the molar composition $LaPO_4:0.01Ce$. This phosphor emits ultraviolet light which peaks spectrally at about 3400 A.U. when excited with cathode rays. The brightness of the emission of a screen of this material is equivalent to that a P-16 screen, which is taken as a standard.

There are many variations that may be made in the process described above without departing from the spirit of the invention, some examples of which follow.

Step I may be completely replaced by using an acceptable commercial grade of lanthanum nitrate. Most commercial grades of lanthanum nitrate have been found to be unacceptable as not being sufficiently pure or as having a variable water content from lot to lot. Step I sets forth a particular method for preparing lanthanum nitrate of suitable purity. Any other method may be used which accomplishes the same objective.

Step II gives a molar ratio of Ce/La of 0.01. Lanthanum may be replaced with yttrium, lutetium or mixtures of two or more of lanthanum, yttrium, or lutetium. The mol ratio of Ce/La may be varied between 0.0001 and 0.1, but is preferably about 0.01. The same mol ratios apply where lanthanum has been replaced in whole or in part as described above.

Step II may be replaced with a simple physical mixing of acceptable commercial grades of lanthanum carbonate and cerium carbonate powders, and any other process which produces an intimate physical mixture of the carbonates in the desired proportions to be used. It is preferred however to coprecipitate the carbonates from an aqueous solution as described, since this is convenient and practical. It is also preferred to provide cerous carbonate containing little or no ceric carbonate. Ceric ions should be reduced to cerous ions during the heating (step IV). By introducing the cerium as cerous ions, the heating step is simplified since this is the desired valence state of the cerium. The reactions which take place in forming the carbonates by the preferred process are simple double replacement reactions in which soluble salts of cerium and lanthanum (and/or yttrium and lutetium) are reacted with soluble carbonate to produce cerous and lanthanum carbonates as a coprecipitate and soluble salts as a waste product. It is preferred to use nitrates, although other soluble cerous and lanthanum salts may be used. It is preferred to use ammonium carbonate as the precipitating agent, although other soluble carbonates may be used. When metal cation carbonates are used, the coprecipitate should be washed free of the metal cation.

In step III, any ammonium phosphate may be used although $(NH_4)_2HPO_4$ is preferred. It is preferred to use a greater proportion up to 2.25 mol part $(NH_4)_2HOP_4$ than the stoichiometric proportion required to react with the lanthanum carbonate. This assures complete reaction of the lanthanum and cerium salts, and the excess ammonium phosphate either volatilizes or, when present, does not adversely affect the product. Any method of mixing the ingredients may be used.

In step IV, the reaction is believed to proceed according the following equations which occur simultaneously $$La_2(CO_3)_3 + 2(NH_4)_2HPO_4 \rightarrow 2LaPO_4 + 2NH_3 + CO_2 + H_2O$$
$$Ce_2(CO_3)_3 + 2(NH_4)_2HPO_4 \rightarrow 2CePO_4 + 2NH_3 + CO_2 + H_2O$$

In the reaction mixture, the molar proportion of $$(NH_4)_2HPO_4$$

to the carbonates may vary from 2 to 2.25 to 1, preferably 2:1. It should be noted that all of the reaction products are volatile except the desired phosphor. Hence, there is no problem in removing waste products from the phosphor.

I claim:
A process for preparing a phosphor comprising:

(1) preparing a first aqueous solution containing $x$ mol part cerium, as a cerous salt thereof where $x$ is between 0.0001 and 0.1, and 1.0 mol part of at least one member of the group consisting of lanthanum, yttrium and lutetium,
(2) adding to a quantity of said first solution a second aqueous solution containing a soluble carbonate in sufficient quantity to coprecipitate all of the cerium, lanthanum, yttrium, and lutetium in said quantity of said first solution,
(3) drying said coprecipitate,
(4) mixing between greater than 2.0 and 2.25 mol part dry ammonium hydrogen phosphate with said dry coprecipitate for each of said 1.0 mol part, and then
(5) heating said mixture to between 1050 and 1150° C. until said phosphor is formed.

References Cited
UNITED STATES PATENTS

| | | | |
|---|---|---|---|
| 2,697,077 | 12/1954 | Smith et al. | 252—301.6 |
| 2,835,636 | 5/1958 | Rimbach | 252—301.4 |
| 3,104,226 | 9/1963 | Struck | 252—301.4 |
| 3,110,680 | 11/1963 | Koelmans et al. | 252—301.4 |
| 3,211,666 | 10/1965 | McAllister | 252—301.4 |

TOBIAS E. LEVOW, *Primary Examiner.*

HELEN M. McCARTHY, *Examiner.*

R. D. EDMONDS, *Assistant Examiner.*